US007672753B1

United States Patent
Rossi

(10) Patent No.: US 7,672,753 B1
(45) Date of Patent: Mar. 2, 2010

(54) OPTIMIZED LIBRARY DEVICE MANAGEMENT

(75) Inventor: Robert P. Rossi, Altamonte Springs, FL (US)

(73) Assignee: Symantec Operating Corporation, Mountain View, CA (US)

(*) Notice: Subject to any disclaimer, the term of this patent is extended or adjusted under 35 U.S.C. 154(b) by 845 days.

(21) Appl. No.: 10/903,100

(22) Filed: Jul. 30, 2004

(51) Int. Cl.
*G06F 17/00* (2006.01)

(52) U.S. Cl. .................. 700/214; 700/215; 711/209

(58) Field of Classification Search .......... 700/214, 700/215; 711/209
See application file for complete search history.

(56) References Cited

U.S. PATENT DOCUMENTS

| | | | |
|---|---|---|---|
| 6,172,833 B1 * | 1/2001 | Fry et al. .................. 360/71 |
| 6,581,076 B1 * | 6/2003 | Ching et al. ............... 707/204 |
| 6,609,046 B2 | 8/2003 | Ostwald et al. | |
| 6,791,910 B1 | 9/2004 | James et al. | |
| 6,810,306 B1 | 10/2004 | Ostwald | |
| 6,856,985 B1 | 2/2005 | Pierce et al. | |
| 6,965,811 B2 | 11/2005 | Dickey et al. | |
| 7,010,387 B2 | 3/2006 | Lantry et al. | |
| 7,263,596 B1 * | 8/2007 | Wideman et al. ........... 711/209 |
| 2001/0020197 A1 * | 9/2001 | Nakano et al. .............. 700/215 |
| 2003/0083777 A1 * | 5/2003 | Ostwald et al. ............. 700/218 |

FOREIGN PATENT DOCUMENTS

JP     08063857 A  *  3/1996

OTHER PUBLICATIONS

"Veritas Media Manager" System Administrator's Guide, Windows NT Server, Release 3.2, May 1999.*

* cited by examiner

*Primary Examiner*—Albert DeCady
*Assistant Examiner*—Tejal Gami
(74) *Attorney, Agent, or Firm*—Meyertons, Hood, Kivlin, Kowert & Goetzel, P.C.

(57) ABSTRACT

Various embodiments of a system and method for optimizing storage library operations. In one embodiment a method may comprise storing a plurality of efficiency values indicative of relative efficiencies of storage targets in a storage library, and executing a storage library operation based on the plurality of efficiency values. Efficiency values may include, for example, information on a physical layout of the storage library. In one embodiment storage targets may include at least the following classes: a slot class, a portal class, a drive class, a picker class, and a media class. In one embodiment, executing a storage library operation based on the plurality of efficiency values may comprise selecting one or more storage targets to implement the storage library operation based on the plurality of efficiency values. For example, a drive closest to a given media unit may be selected to read the media unit.

21 Claims, 4 Drawing Sheets

OPTIMIZED LIBRARY DEVICE MANAGEMENT

BACKGROUND OF THE INVENTION

1. Field of the Invention

This invention relates to the field of computer processing and, more particularly, to data storage libraries.

2. Description of the Related Art

Modern businesses increasingly own large numbers of computers, servers, and other information technology (IT) infrastructure, all of which may produce and process increasingly large amounts of data. In some instances the vast majority of this data may be discarded, but in other instances significant amounts of data must be stored and maintained in a storage library.

Storage libraries may be operable to store and retrieve storage media for reading and writing by an external computer system. Storage media may be tapes, discs, or other media which are typically operable to store tens of gigabytes or more per unit. Each storage media unit is typically stored within a slot, or storage area, and transported to and from a compatible media drive or access portal by a "picker". Sizes of storage media libraries may differ greatly, with some configurations holding only a handful of media units and a single drive, while others hold hundreds or thousands of media units and dozens of drives.

One or more external computers may be attached to the storage library by means of a network or data connection. These computers may be operable to access the media drives and to issue commands to move storage media units to and from various slots and drives via the picker, thereby giving any computer connected to the storage library the ability to access any media unit within the library at any time without human intervention.

A computer connected to the storage library may typically address storage targets such as slots, media units, drives, portals, and pickers within the library by a logical identifier. However, such logical identifiers typically give no indication as to the storage targets' relative spatial locality. For example, a computer may be unable to distinguish between a slot located close to a specific drive and a slot located far from the drive. Accordingly, an external computer is typically unable to lay out media in an efficient manner, which may in turn cause delays in retrieving and storing media units within the storage library.

SUMMARY OF THE INVENTION

Various embodiments of a system and method for optimizing storage library operations are disclosed. In one embodiment a method may comprise storing a plurality of efficiency values indicative of relative efficiencies of storage targets in a storage library, and executing a storage library operation based on the plurality of efficiency values. Efficiency values may include, for example, information on a physical layout of the storage library, or information on the relative performance between storage targets in the library. In one embodiment storage targets may include at least the following classes: a slot class, a portal class, a drive class, a picker class, and a media class.

In one embodiment, executing a storage library operation based on the plurality of efficiency values may comprise selecting one or more storage targets to implement the storage library operation based on the plurality of efficiency values. For example, a drive closest to a given media unit may be selected to read the media unit.

In a further embodiment, the method may comprise arranging physical locations of storage media within the storage library depending on usage patterns of the storage media and the plurality of efficiency values. The method may also comprise determining the plurality of efficiency values based on timed operations.

In yet another embodiment, the plurality of efficiency values may define logical pools of storage target types. The efficiency values may further comprise one or more logical pool efficiency ratings. Alternatively, in another embodiment the plurality of efficiency values may comprise an efficiency relationship between at least two storage targets.

Figure 1A:
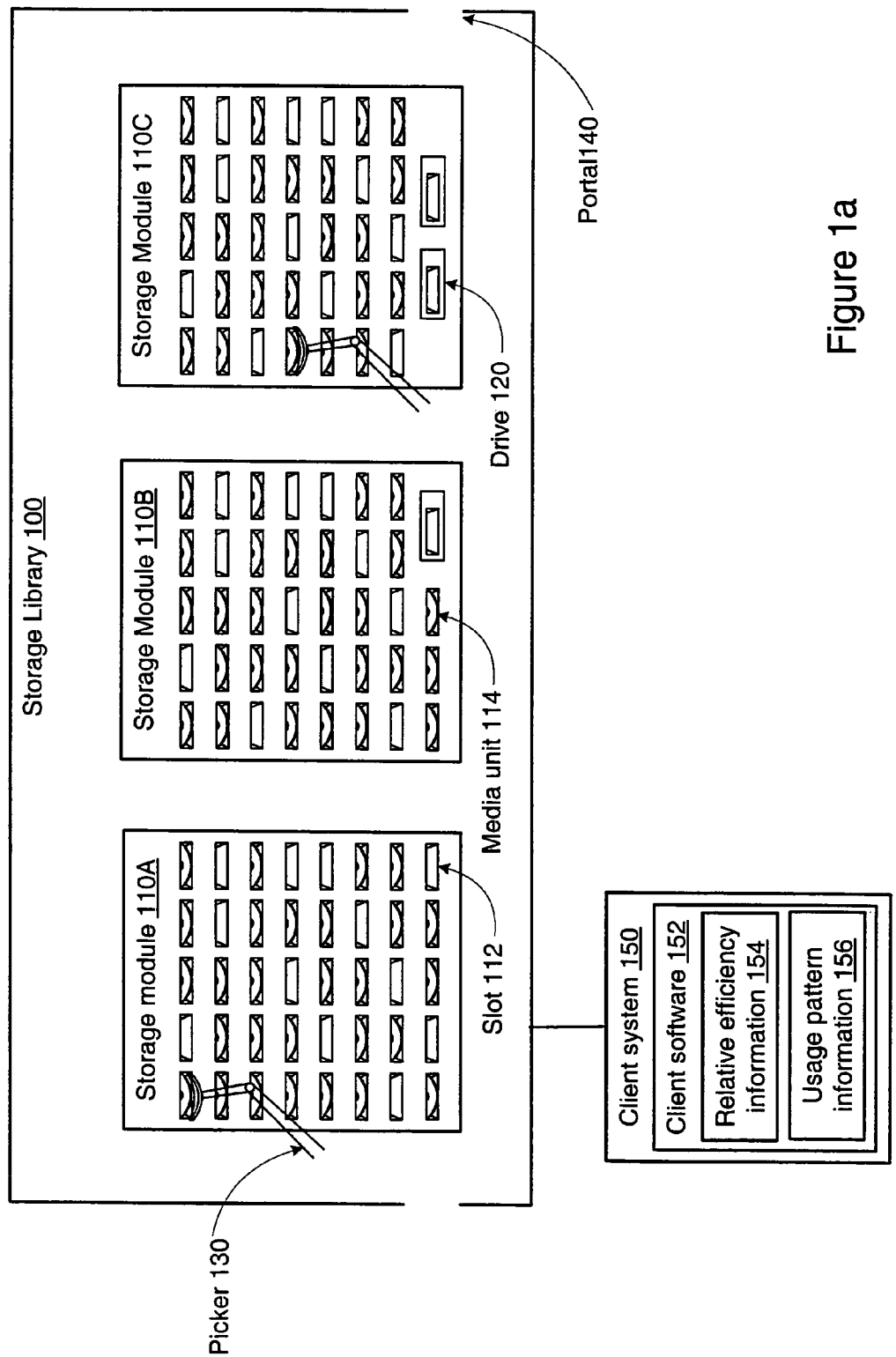
FIG. 1a is a block diagram of one embodiment of a storage library.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Turning now to FIG. 1a, a block diagram illustrating one embodiment of a storage library 100 is shown. Storage library 100 may be operable to store, read, write, and retrieve a plurality of media units 114. As will be described in further detail below, in some embodiments storage library 100 may be connected to a client system 150 and operable to execute various operations in accordance with instructions from client software 152 executing on client system 150.

Storage library 100 may be comprised of one or more storage modules 110A-C (referred to generally as storage modules 110). Each storage module 110 comprises a plurality of slots 112 and media units 114. Each slot 112 may be a space configured to hold a media unit 114 for an indefinite period of time. Each media unit 114 may be a magnetic tape, optical disc, or other device operable to store binary data. Storage modules 110 may also include one or more portals 140, which may be configured to allow an end user to store and retrieve media units 114 from storage library 100.

In some embodiments, storage modules 110 may further include one or more drives 120. Depending on the media type, each drive 120 may be a tape drive, disc reader, disc burner, or other media drive operable to read or write binary data to and from a media unit 114 in the drive. Storage modules 110 may also further include a picker 130 operable to transport media units 114 to and from slots 112, drives 120, and portals 140. In one embodiment picker 130 may be a robotic arm operable to access media from any storage module 110 in storage library 100, while in other embodiments picker 130 may be a carousel operable only to move media units 114 within a storage module 110. It is further noted that in some embodiments each slot 112 may contain mechanical devices operable to assist picker 112 in transporting media units 114.

Furthermore, in some embodiments each storage module 110 may be configured to interoperate with other storage modules 110. For example, a storage module such as 110A, which contains no drives 120, may be operable to use a picker 130 to transport a media unit 114 to and from a drive 120 in storage module 110B or 110C. Furthermore, additional storage modules 110 may be added to storage library 100 to further expand the storage library capacity. It is also noted that in some embodiments, storage library 100 may be a purely virtual device which is emulated using one or more hard drives and computers.

Storage library 100 may be connected to one or more client systems 150 via a data connection such as SCSI or Fibrechannel, or by a network connection such as a local area network (LAN), a wide area network (WAN) or the Internet. Client system 150 may be any kind of computer, including, but not limited to, a desktop, laptop, workstation, server, or palmtop computer.

Client system 150 may further be operable to execute client software 152. Client software 152 may be any kind of software operable to control the operation of storage library 100. For example, client software may be operable to issue a command for a picker 130 to move a media unit 114 in a specific slot 112 to a specific drive 120, or to eject a media unit 114 from a specific drive 120 and have a picker 130 convey the media unit to a portal 140 to be ejected out of storage library 100. In one embodiment client software 152 may be a set of library routines accessed by one or more software applications, while in other embodiments client software 152 may be part of a software application such as a backup application or data mining application. In still further embodiments client software 152 may execute on storage library 100.

In one embodiment, client software 152 may comprise relative efficiency information 154 and usage pattern information 156. As will be described in further detail below, client software 152 may be operable to acquire and maintain relative efficiency information 154 and usage pattern information 156 through various means, and to use relative efficiency information 154 and usage pattern information 156 to carry out storage library operations more quickly and efficiently.

Figure 1B:
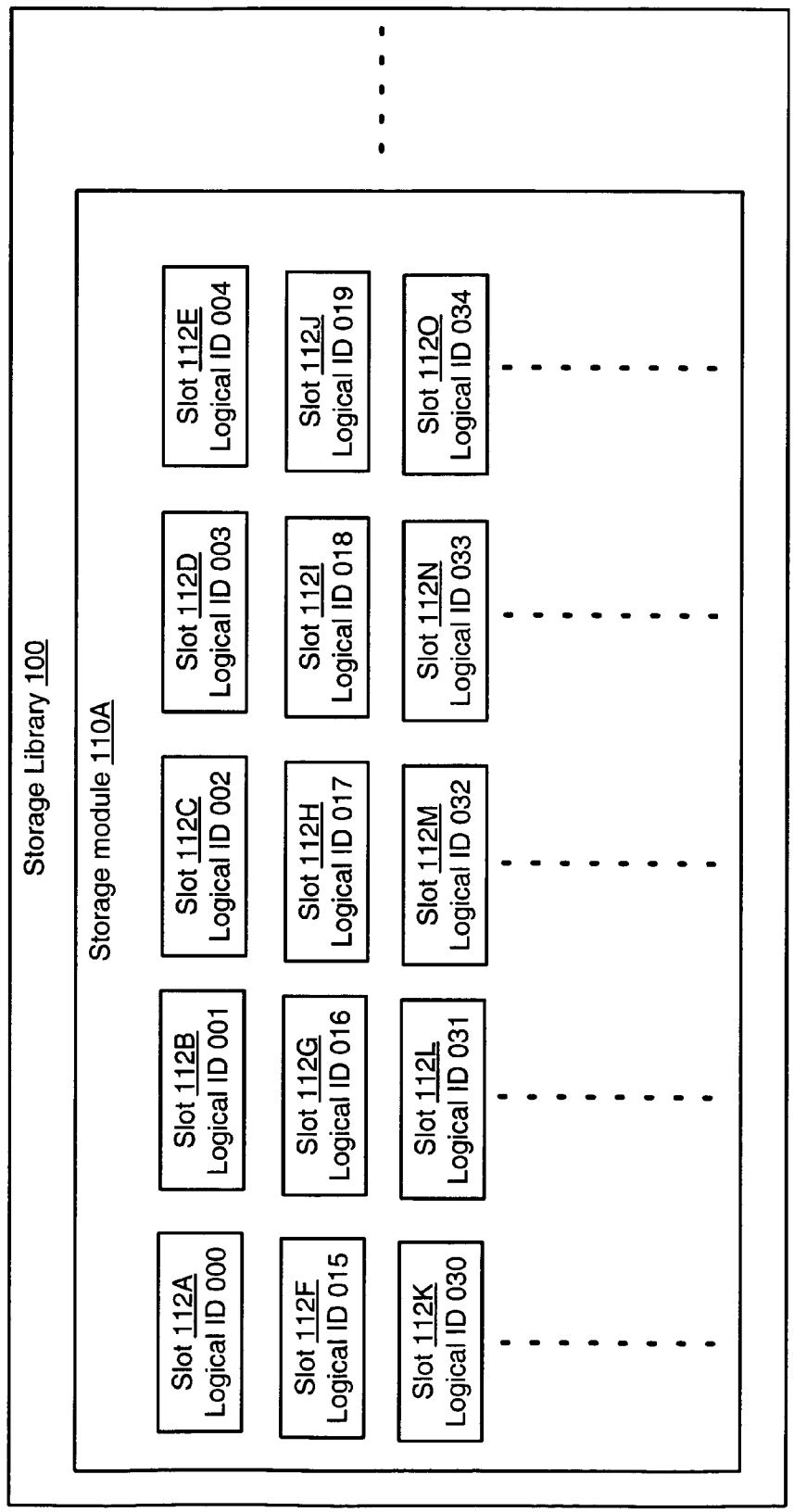
FIG. 1b is a block diagram of one embodiment of a scheme for logically identifying slots in a storage library.

Turning now to FIG. 1b, a block diagram illustrating one embodiment of a scheme for logically identifying slots 112 in storage library 100 is shown. As shown in FIG. 1b, a first slot 112A may be assigned a first logical ID "000", while slot 112B, immediately to one side, may be assigned logical ID "001". Slot 112C may be assigned logical ID "002", and so forth. However, as illustrated by FIG. 1b, slot 112F immediately below slot 112 may be assigned logical ID "015", slot 112G may be assigned logical ID "016", etc.

It is noted that client software 152, which issues commands based on logical IDs, may not have information on the physical layout of storage library 100. Accordingly, the client software may not be able to make decisions based on the information that the slots identified by logical IDs "000" and "015" are next to each other, or that logical ID "014" (not shown) may be in an entirely different storage module 110 than logical ID "015". In addition, the logical ID scheme illustrated in FIG. 1b may assign logical IDs to drives 120 and portals 140 that fail to indicate how close the drives and portals are to a specific slot 112. Accordingly, client software 152 may be unable place certain frequently accessed media units 114 in close proximity to specific slots 112, drives 120 or portals 140, which may in turn lead to inefficiency while executing operations in storage library 100.

Figure 2:
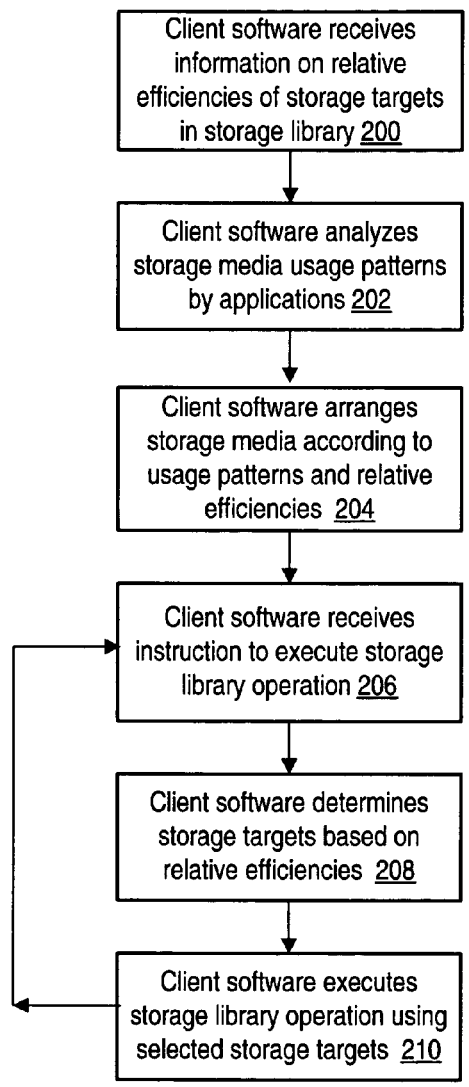
FIG. 2 is a flowchart illustrating one embodiment of a method for a method for efficiently executing storage library operations.

FIG. 2 illustrates one embodiment of a method for efficiently executing storage library operations. More particularly, client software 152 may determine information on relative efficiencies and usage patterns of storage targets in a storage library 100. It is noted that information on relative efficiencies may include information on the physical layout of storage targets within storage library, and information on the relative performance between storage targets.

In step 200, client software 152 receives information on the relative efficiencies of various storage targets in storage library 100, including, but not limited to, slots 112, media units 114, drives 120, pickers 130, and portals 140. In one embodiment, a user may specify a mapping between one or more logical IDs of storage targets and a physical layout of storage targets in the storage library. For example, a user may specify the mapping by providing a file with mapping information to client software 152, or a user may interactively describe the mapping information to client software 152 through a graphical user interface. The user may further specify information on the relative performance of storage targets and between storage targets, including, but not limited to, the read and write speeds of drives 120, the storage capacity of media units 114, the speed at which various pickers 130 operate between drives 120 and slots 112, and the "home" position to which each picker 130 returns when not in use. Alternatively, in another embodiment, client software 152 may utilize vendor specific protocols to gather information on relative efficiencies from storage library 100.

In yet another embodiment, client software 152 may carry out a series of timed operation tests to determine the relative efficiencies of various storage targets within storage library 100. For example, in one embodiment client software 152 may determine how long each picker 130 takes to transport a media unit 114 from each drive 120 to each slot 112. Furthermore, in one embodiment client software 152 may determine how long each picker 130 takes to transport a media unit 114 from each slot 112 to all other slots 112, or to each portal 140.

It is noted that in one embodiment client software 152 may arrange storage targets into an efficiency matrix based on the relative efficiency information determined in step 200. For example, in one embodiment client software 152 may maintain a data structure indicating a relative efficiency rating between multiple storage targets.

It is also noted that in one embodiment client software 152 may only perform select timed operations to form a representative sampling of the relative efficiencies of each storage target, while in another embodiment client software 152 may analyze the results of timed operations to determine patterns which may indicate various spatial mappings. For example, in one embodiment client software 152 may determine that there is a short transportation time between slots 112 with logical IDs "000" and "015" in FIG. 1b, while there is a long transportation time between slots 112 with logical IDs "000" and "014". Accordingly, client software 152 may be operable to determine that the storage library 100 of FIGS. 1a and 1b is laid out as a 15×8 grid of slots 112.

In step 202, client software 152 determines information on usage patterns of media 114 by various software applications. In one embodiment, client software 152 may automatically track statistics on the use of media units 114, including but not limited to which units are most often accessed, which units are most often removed from storage library 100, and which units are most often accessed immediately after other specific units are accessed. Alternatively, in one embodiment an end user may specify which media units 114 should be grouped together, which media units should be located in close proximity to a drive 120 and which media units should be located in close proximity to a portal 140. In such an embodiment the user may further specify which media units 114 should be stored in which specific slots 112.

In step 204, client software 152 arranges media units 114 according to the information on relative efficiencies determined in step 200 and the usage patterns determined in step 202. For example, in the storage library 100 illustrated in FIG. 1*a*, client software 152 may arrange each media unit 114 so that the most often accessed units are closest to the two drives 120 in storage module 110C, while frequently imported and exported units are closest to the portal 140 by storage module 110A.

Furthermore, as described above, information on the relative performance of each storage target may further be utilized to arrange media units 114. For example, in one embodiment client software 152 may determine that a particular drive 120 may read and write data faster than other drives 120. Accordingly, client software 152 may place a higher priority on placing media units 114 in close proximity to the high-speed drive 120 than on placing media units 114 in close proximity to other drives 120.

In step 206, the client software 152 receives an instruction to execute one or more operations with storage library 100. In one embodiment the instructions may be from an end user, while in another embodiment the instructions may be from a software application which accesses data in storage library 100 via client software 152. It is noted that in one embodiment, an instruction to execute a storage library operation may comprise an instruction to read or write data from a certain tape. Accordingly, client software 152 may be operable to execute the instruction by issuing various commands to storage library 100. For example, client software 152 may determine which slot 112 a given media unit 114 is in, select a picker 130 to transport the media unit, and select a drive 120 to read the media unit.

In step 208, the client software 152 determines storage targets based on the information on relative efficiencies determined in step 200. For example, in one embodiment client software 152 may be instructed to place a blank media unit 114 in a drive 120 for data to be recorded on to the media unit. Accordingly, client software 152 may select a blank media unit 114 which is closest to a drive 120. Client software 152 may then utilize the relative performance information determined in step 200 to select a picker 130 with the best response times to transport the blank media unit 114 to drive 120. In one embodiment client software 152 may choose a storage target based on the efficiency matrix described above.

In step 210, client software 152 utilizes the selected storage targets to carry out the operations specified in step 206. Client software 152 may then return to step 206 and await a new instruction to carry out a storage library operation. It is noted that by utilizing information on the relative efficiencies of storage targets and information on usage patterns of media units 114, client software 152 may be able to carry out storage library operations more quickly and efficiently.

It is also noted that, in one embodiment, client software 152 or an end user may group one or more storage targets in storage library 100 into logical pools. Logical pools may be subsets or classes of storage targets which may have similar usage characteristics. For example, in one embodiment a logical pool may be a subset of media units 114 which are frequently removed from storage library 100, and which may accordingly be located near a portal 140. Alternatively, a logical pool may be a group of high-speed drives 120, near which a second logical pool of frequently accessed media units 114 may be stored in slots 112. It is further noted that, by defining and maintaining a relative efficiency rating for and between logical pools, rather than each individual storage target in storage library 100, client software 152 may be able to manage efficiency and usage information more simply. Furthermore, client software 152 may have to receive less mapping information from an end user, or may be able to carry out fewer timed operation tests to determine relative efficiency information.

Figure 3:
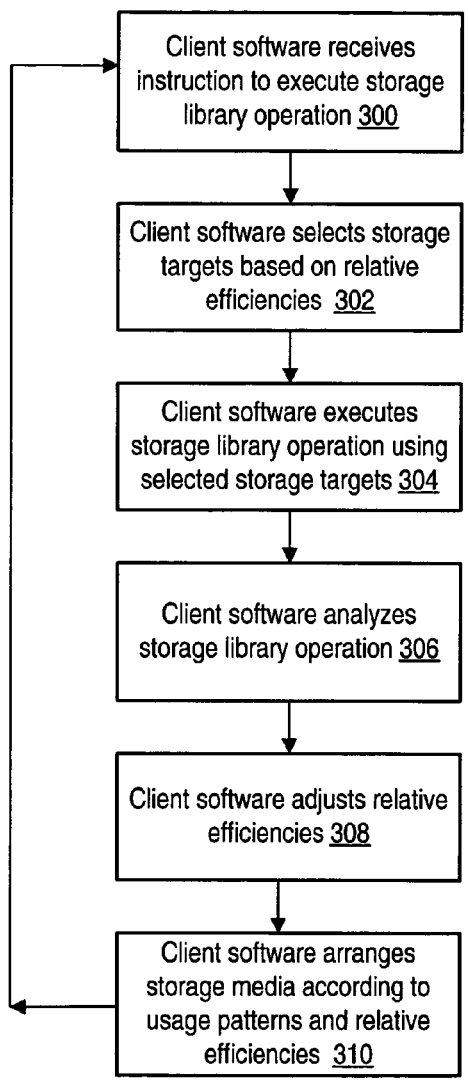
FIG. 3 is a flowchart illustrating another embodiment of a method for a method for efficiently executing storage library operations.

Turning now to FIG. 3, an alternate embodiment of a method for efficiently executing storage library operations is illustrated. More particularly, client software 152 may dynamically determine information on relative efficiencies and usage patterns of storage targets in a storage library 100. In step 300, client software 152 receives an instruction to execute a storage library operation. As described above, in one embodiment the instructions may be from an end user, while in another embodiment the instructions may be from a software application which accesses data in storage library 100 via client software 152.

In step 302, client software 152 determines which storage targets to utilize to carry out the storage library operation, based on the known relative efficiencies of each storage target. For example, in one embodiment client software 152 may utilize a drive 120 or a picker 130 known to operate faster than other storage targets of the same class. It is noted that in one embodiment, client software 152 may initially have no information on the relative efficiencies of storage targets in storage library 100. In such an embodiment, client software 152 may pick any appropriate storage target by selecting the target with the first available logical ID, or by utilizing a random number selection scheme or a round-robin selection method. In step 304 client software 152 carries out the storage library operation utilizing the selected storage targets.

In step 306 client software 152 analyzes the storage library operation to determine additional information on relative storage efficiencies and usage patterns. For example, in one embodiment client software 152 may time an operation using a specific picker 130 and compare the resulting information to information measured during similar operations using different pickers 130, and thereby derive an understanding of the relative efficiencies of each picker. Client software 152 may similarly measure the speed at which data is read or written by a drive 130, and may measure the transport times from specific slots 112 to various drives 120 and portals 140. Client software 152 may also measure how many times each media unit 114 is accessed or removed from storage library 100, as well as any information on which media units 114 may be associated with other media units 114, thereby determining information on storage target usage patterns.

In step 308, client software 152 adjusts information on relative efficiencies based on the analysis carried out in step 306. For example, in one embodiment client software 152 may maintain an efficiency matrix listing relative efficiency ratings for each storage target and between various storage targets. Client software 152 may accordingly use the matrix to select various storage targets to be used in carrying out a storage library operation, as described above in step 302. After analyzing the performance of the storage targets in step 306, client software 152 may alter the matrix to better indicate the known efficiencies of the observed storage targets in step 308.

It is noted that, as described above, rather than analyzing and maintaining relative efficiency ratings for each storage target in storage library 100, client software 152 may maintain relative efficiency ratings and usage pattern information for and between logical pools of storage targets, wherein each logical pool may be a subset or class of storage targets which may have similar usage characteristics. Client software 152 may accordingly be able to more simply analyze and maintain information on storage targets by using a smaller number of logical pools, rather than tracking information on every storage target in storage library 100.

In step 310, client software 152 may arrange storage targets in storage library 100 according to observed usage patterns and information on known relative efficiencies. For example, in one embodiment client software 152 may determine that a subset of media units 114 are often accessed one after another or frequently accessed in comparison to other media units 114 not in the subset. Accordingly, client software 152 may place the subset of the media units 114 in a set of slots 112 which are located near each other and located near a drive 120, based on analysis of measured transportation times observed during step 306. Client software 152 may then return to step 300 and await a new instruction to carry out a storage library operation.

It is noted that in one embodiment, steps 304, 306, 308, and 310 may be carried out in a different order, or simultaneously with each other. For example, in one embodiment client software 152 may receive instructions to move a set of media units 114 to a drive 120 and read data off of the units, one after another. Accordingly, client software 152 may be operable to determine that the media units 152 contain related data, and may move each unit to a group of close-together slots 112 after carrying out the individual read operations, thereby grouping the media units 114 together for more efficient retrieval at a later time.

It is also noted that in one embodiment, client software 152 may select storage targets in step 302 based on which storage targets have not been analyzed for relative performance. For example, in one embodiment, rather than repeatedly selecting a picker 130 which operates at a known speed, client software 152 may select a different picker 130 which operates at an unknown speed, thereby expanding the information on the relative efficiencies of storage targets.

It is further noted that by repeatedly cycling through the steps of FIG. 3, client software 152 may dynamically determine information on the relative efficiencies and usage patterns of each storage target in storage library 100, even as usage patterns change, new storage targets are introduced, or the performance of existing storage targets changes over time. Accordingly, client software 152 may dynamically alter how storage library operations are carried out based on the updated usage information, thereby continually maintaining efficient operation of storage library 100.

It is also additionally noted that, in accordance with the steps described above in FIG. 3, client software 152 may be able to maintain efficient library operation without the need for vendor-specific protocols or end user intervention to provide a physical mapping of storage library 100. Accordingly, the method of FIG. 3 may provide a generalized mechanism for improving the efficiency of any storage library 100 connected to client software 152.

Figure 4:
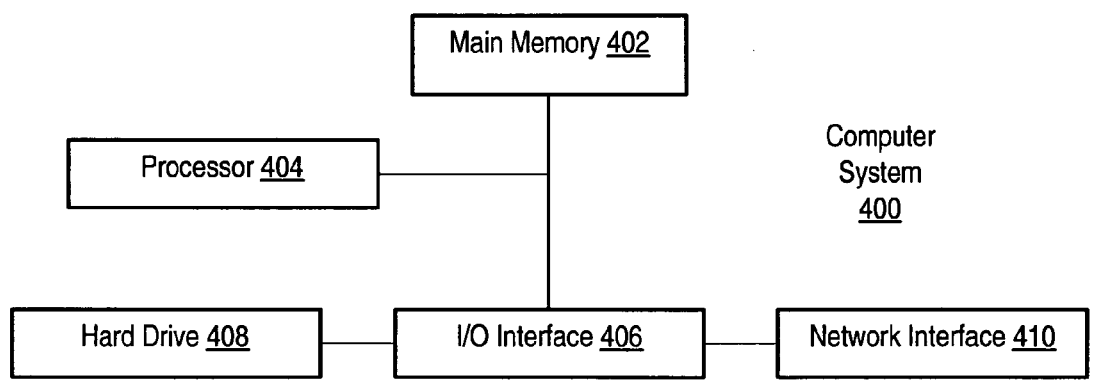
FIG. 4 is a block diagram of one embodiment of a computer system.

FIG. 4 illustrates exemplary components of a computer system 400 representative of client system 150. Computer system 400 includes a processor 404 coupled to a main memory 402. Processor 404 and main memory 402 are in turn connected to an I/O interface 406, which further connects to a hard disk drive 408 and a network interface 410. It is noted that computer system 400 may be representative of a laptop, desktop, server, workstation, terminal, personal digital assistant (PDA) or any other type of computer system.

Processor 404 is representative of any of various types of processors such as an x86 processor, a PowerPC processor or a SPARC processor. I/O interface 406 is operational to transfer data between processor 404 and/or main memory 402 and one or more internal or external components such as hard disk drive 408 and network interface 410, as desired. Hard disk drive 408 may be a non-volatile memory such as a magnetic media. Network interface 410 may be any type of network adapter, such as Ethernet, fiber optic, or coaxial adapters.

Main memory 402 is representative of any of various types of memory, including DRAM, SRAM, EDO RAM, Rambus RAM, etc. Main memory 402 may store code to implement client software 152.

It is further noted that any of the embodiments described above may further include receiving, sending or storing instructions and/or data that implement the operations described above in conjunction with FIGS. 1-3 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
executing one or more storage library operations, wherein the storage library includes storage targets including media drives, media storage units, and slots;
determining usage patterns of the storage library;
arranging physical locations of the media storage units within the storage library depending on the usage patterns;
storing a plurality of efficiency values indicative of relative efficiencies of the storage targets in the storage library, wherein the plurality of efficiency values comprise an efficiency rating between at least two storage targets;
grouping the storage targets in the storage library into logical pools having similar said usage patterns;
maintaining the relative efficiency rating for and between the logical pools; and
executing subsequent storage library operations based on the usage patterns and the plurality of efficiency values.

2. The method of claim 1 further comprising:
determining the plurality of efficiency values based on timed operations.

3. The method of claim 1, wherein executing a storage library operation based on the plurality of efficiency values comprises selecting one or more storage targets to implement the storage library operation based on the plurality of efficiency values.

4. A system comprising:
a storage library comprising one or more storage targets including media drives, media storage units, and slots; and
a client system configured to execute client software, wherein the client software is executed to:
execute storage library operations;
determine usage patterns of the media drives and the media storage units;

arrange physical locations of the media storage units within the storage library depending on the usage patterns;

store a plurality of efficiency values indicative of relative efficiencies of the storage targets in the storage library, wherein the plurality of efficiency values comprise an efficiency rating between at least two storage targets;

group the storage targets in the storage library into logical pools having similar said usage patterns;

maintain the relative efficiency rating for and between the logical pools; and execute subsequent storage library operations based on the usage patterns and the plurality of efficiency values.

5. The system of claim 4, wherein the client software is further operable to determine the plurality of efficiency values based on timed operations.

6. The system of claim 4, wherein executing a storage library operation based on the plurality of efficiency values comprises selecting one or more storage targets to implement the storage library operation based on the plurality of efficiency values.

7. A computer readable storage medium including program instructions executable to implement a method comprising:

executing one or more storage library operations, wherein the storage library includes storage targets including media drives, media storage units, and slots;

determining usage patterns of the storage library;

arranging physical locations of the media storage units within the storage library depending on the usage patterns;

storing a plurality of efficiency values indicative of relative efficiencies of storage targets in a storage library, wherein the plurality of efficiency values comprises an efficiency rating between at least two storage targets;

grouping the storage targets in the storage library into logical pools having similar said usage patterns;

maintaining the relative efficiency rating for and between the logical pools; and executing subsequent storage library operations based on the usage patterns and the plurality of efficiency values.

8. The computer readable storage medium of claim 7, wherein the method further comprises:

determining the plurality of efficiency values based on timed operations.

9. The computer readable storage medium of claim 7, wherein executing a storage library operation based on the plurality of efficiency values comprises selecting one or more storage targets to implement the storage library operation based on the plurality of efficiency values.

10. The method of claim 1, further comprising determining the usage patterns by tracking usage statistics of the media drives and the media storage units.

11. The method of claim 1, further comprising grouping the one or more storage targets into one or more logical pools, wherein each logical pool includes storage targets having similar usage patterns.

12. The method of claim 1, further comprising arranging physical locations of the media drives and the media storage units by placing media storage units that are frequently accessed within slots in close proximity to media drives having faster access times than other media drives.

13. The method of claim 1, further comprising arranging physical locations of the media drives and the media storage units by placing media storage units that are frequently removed from the storage library within slots in close proximity to a storage library portal.

14. The system of claim 4, wherein the client software is further operable to determine the usage patterns by tracking usage statistics of the media drives and the media storage units.

15. The system of claim 4, wherein the client software is further operable to arrange physical locations of the media drives and the media storage units by placing media storage units that are frequently accessed within slots in close proximity to media drives having faster access times than other media drives.

16. The system of claim 4, wherein the client software is further operable to arrange physical locations of the media drives and the media storage units by placing media storage units that are frequently removed from the storage library within slots in close proximity to a storage library portal.

17. The system of claim 4, wherein the client software is further operable to group the one or more storage targets into one or more logical pools, wherein each logical pool includes storage targets having similar usage patterns.

18. The computer readable storage medium of claim 7, wherein the program instructions executable to implement a method further comprising determining the usage patterns by tracking usage statistics of the media drives and the media storage units.

19. The computer readable storage medium of claim 7, wherein the program instructions executable to implement a method further comprising grouping the one or more storage targets into one or more logical pools, wherein each logical pool includes storage targets having similar usage patterns.

20. The computer readable storage medium of claim 7, wherein the program instructions executable to implement a method further comprising arranging physical locations of the media drives and the media storage units by placing media storage units that are frequently accessed within slots in close proximity to media drives having faster access times than other media drives.

21. The computer readable storage medium of claim 7, wherein the program instructions executable to implement a method further comprising arranging physical locations of the media drives and the media storage units by placing media storage units that are frequently removed from the storage library within slots in close proximity to a storage library portal.

* * * * *